March 3, 1936.   A. W. SEYFRIED   2,032,552
MOTOR BEARING PLATE
Original Filed Jan. 29, 1930
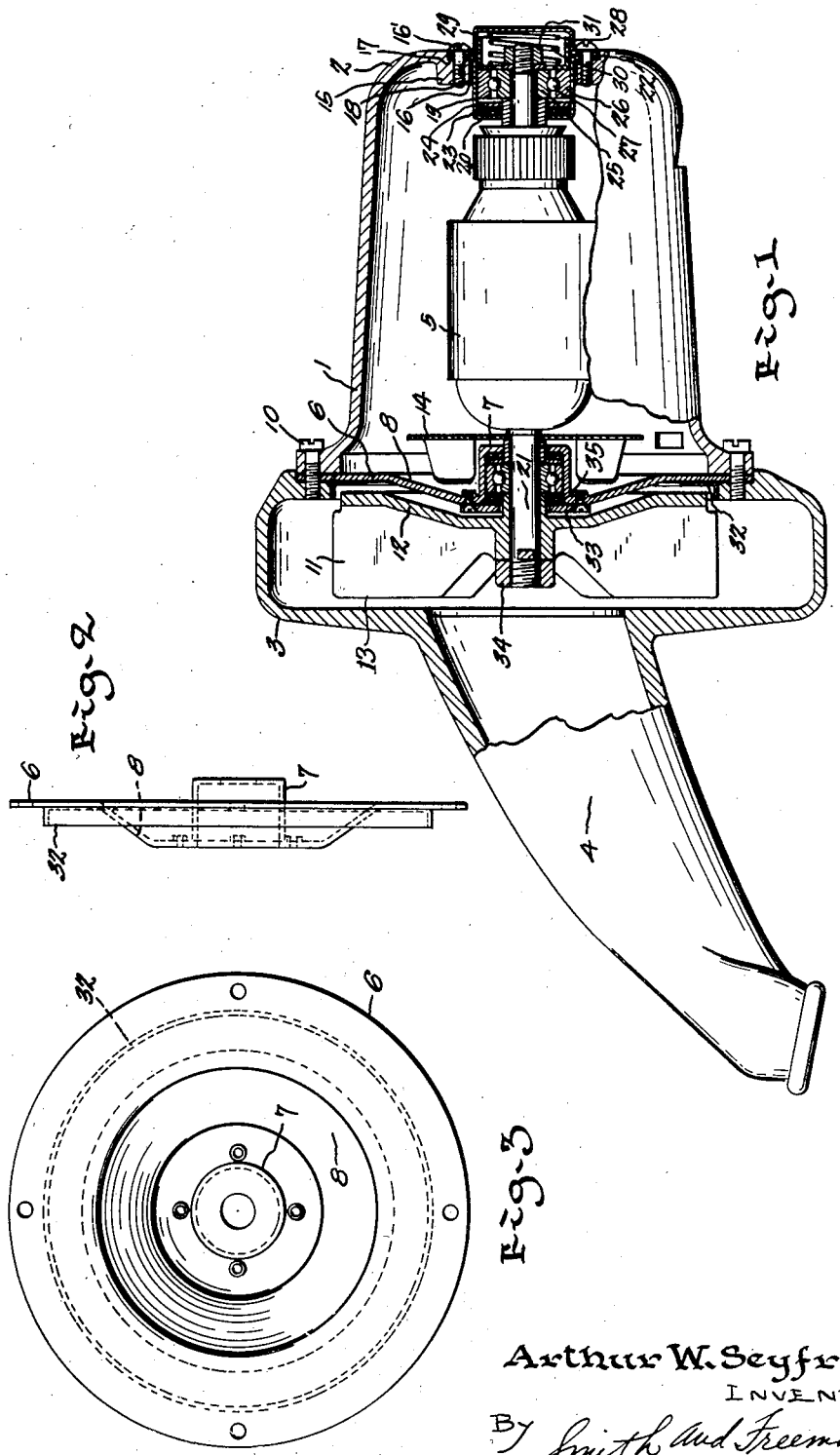
Arthur W. Seyfried
INVENTOR
By Smith and Freeman
ATTORNEYS Patented Mar. 3, 1936

2,032,552

UNITED STATES PATENT OFFICE 2,032,552

MOTOR BEARING PLATE

Arthur W. Seyfried, Cleveland Heights, Ohio, assignor to The Apex Electrical Manufacturing Company, Cleveland, Ohio, a corporation of Ohio Original application January 29, 1930, Serial No. 424,289. Divided and this application April 11, 1931, Serial No. 529,423

18 Claims. (Cl. 172—36)

This invention relates to improvements in vacuum cleaning apparatus and in particular portable cleaners employing an electric motor for suction creating purposes.

One of the objects of my invention is to provide in a vacuum cleaner a highly efficient rotary fan, especially designed for this particular use.

Another object of my invention is to improve machines of the character described by improving the construction of their casings to the end that less machine work is required and thereby the cost of manufacture will be reduced.

Another object of my invention is to arrange and construct the internal parts of the device in such a manner that there is a minimum of waste space and so that a relatively large motor may be housed within a comparatively small casing.

A further object of my invention is to provide an improved bearing assembly unit whereby the greater part of the machine work usually required in manufacturing the shaft bearing supports for various types of bearings may be eliminated, and in which the bearing plate is of such construction that the shaft bearing may be accurately positioned and at all times maintained in operative position to the shaft without boring or reaming the plate in which the bearing is supported, for the purpose of receiving the bearing.

The above objects may be attained by forming the motor housing in the shape of a cup, the open end of which is adapted for the reception of a steel stamping or plate, having a cup formed centrally thereof for reception of the motor bearing. The cup is carried in a concave or saucer-like depression formed in the plate which provides room for the accommodation of the cup and at the same time conforms to the general outline of the cleaner fan disk which is positioned directly in front of this plate.

By supporting the forward motor bearing in the manner shown and using a fan of the shape disclosed it is possible to use a longer motor armature for a given motor case than would be possible if a flat bearing plate and fan disk were used. By the use of a metal stamping for the bearing plate with the bearing cup integrally formed therein, several machining operations are eliminated as well as the need of the separate pressed metal cup. The reason for the necessity of mounting the bearing in stampings, is due to the fact that it is impractical to machine a bore for the reception of such bearings within the required limits of accuracy, made necessary by the high speed of the motor. By use of the construction shown a compact, efficient, powerful and inexpensive vacuum cleaner is provided.

This application is a division of my prior application Serial No. 424,289, filed January 29, 1930.

Referring to the drawing, Fig. 1 is a side elevational view partly in section of a vacuum cleaner embodying one form of my improvements. Fig. 2 is a side elevational view of the motor bearing plate and Fig. 3 is a plan elevational view of motor bearing plate.

In Fig. 1 which shows a vacuum cleaner illustrating one mode of practising my invention, the numeral 1 designates the body section of the motor housing or casing which includes an end portion 2 that is unitary therewith. The opposite end of the motor casing is adapted for reception of the fan housing or chamber 3 which is provided with suction nozzle 4 integrally formed thereon.

The housing 1 encloses a motor armature body 5 which is provided with a shaft 21 extending therethrough and journaled at one end in a suitable bearing supported by the housing wall 2 and journaled at the other end in a suitable bearing supported in the bearing plate 6. This plate is provided with a cup portion 7 which is supported and formed in the center of a conical or saucer-like depression 8. The plate 6 is further provided with a series of holes for reception of the screws 10 to secure it between the fan case 3 and housing 1. Field magnets (not shown) are supported in the housing 1 about the armature 5. As is customary in motors of this type the field magnets and their coils extend over practically the entire length of the armature 6 and its windings as illustrated in Figure 2 of Lang Patent No. 1,635,047.

As an example of the process of forming the bearing plate 6, a flat disk of sheet steel of about six and one-quarter inches in diameter is first pressed between suitable dies and a bulge having a depth of about one and one-half inches at its center is drawn in the plate. The bulged plate is then subjected to a second drawing operation and the central part of its bulge is reversed upon itself to form the cup 7 while at the same time the bulge is greatly reduced and the plate assumes the shape shown in the drawing.

A suction fan is rigidly and removably carried on the forward end of the armature shaft 21 and housed in a fan chamber 3. The fan is constructed with a disk 13 supporting a series of impeller blades 11 which are cut away at the central or hub portion of the fan disk. The central portion of the fan is slightly raised or dished as at 12 in order to conform to the path of the air that is flowing past the disk of the fan and thus increases the efficiency of the fan.

Attention is called to the fact that the disk 13 of the fan is of similar shape to the bearing plate 6 so that these units may be assembled in very compact relation in respect to each other. By reason of the conical depression in the plate 6 the motor cooling fan 14 may be positioned with its blades extending therein over the motor bearing which in turn projects for some distance into this space formed by the dished portion of the fan and bearing plate permitting a very compact assembly of these parts and at the same time allowing space for the accommodation of a large and powerful electric motor.

By reason of forming the plate with approximately half of the bearing cup within the conical depression it is possible to position a bearing in the cup substantially in the plane of the outer supported edge of the plate so that vibrations transmitted to the plate through the bearing will be radially outward and in the plane of the plate, thereby preventing transverse vibrations being set up in the plate to the damage of the motor and its bearings.

The end wall 2 of the motor casing is provided upon its inner face with a central boss 15. Through this housing wall in concentric relation to the boss an opening 16 is formed. The circumferential face of this opening is unchanged and the only machining of an accurate character which is required is the finish of the face of the recess 17 which is formed on the face of the boss 15.

Through the face of the boss in spaced relation to the edge of the opening 16, additional threaded openings 18 are formed. The bearing assembly supported by the casing wall 2 includes a cup 19 which is accurately formed of the required dimensions by a pressing and drawing operation. This cup at one of its ends has a wall 20 provided with a central opening to receive the armature shaft 21.

Upon the opposite end of the body wall of the said cup an outwardly extending annular flange 22 is formed. This flange is adapted to be seated against the finished face of the recess 17 and is provided with openings to register with the threaded openings in the housing wall.

Within the inner closed end of the wall 20 an annular gasket 23 of felt or other suitable material is disposed. A metal washer 24 is fastened within the cup against this gasket. Within the cup 19 a ball bearing of the open type is illustrated. This bearing includes an inner ring 25 engaged upon the reduced portion of the armature shaft 21 and an outer ring 26 having a snug frictional fit within the cup 19. Between these inner and outer rings of the case, carrying bearing balls 27 are disposed. A locknut 31 secures the bearing to the shaft 21.

A pressed sheet metal part 28 is positioned within the outer end of the cup 19 and has an inwardly extending flange fitting against the outer face of the bearing ring 26. A retaining plate 29 is also provided with openings registering with openings of a flange 22 and through these coinciding openings the screws 16' are disposed and threaded through the openings of the housing. This bearing assembly includes a spring 30 which presses against the part 28 and functions to take up all axial or end play of the armature shaft and bearings.

The opposite end of the armature shaft is supported in a similar bearing which however is carried in a cup 7 which is integrally formed in the depression 8 of the pressed metal plate 6. This latter construction eliminates the use of a separate cup to contain the bearing as well as the machining operations necessary for its reception. This latter bearing is secured to the armature shaft by means of the nut 34 which also serves to secure the fans to the armature shaft. A felt gasket 35 is secured over the front end of the bearing by means of a washer 33 secured to the plate 6. The ball bearing and washer and gasket behind it are similar to the corresponding elements described in connection with the bearing first mentioned. The gaskets serve to prevent the ingress of dust and dirt to the bearing as well as preventing the escape of the lubricant in which the bearing is packed when it is installed in the machine.

Due to the dished shape of the plate 6 and the forming of the bearing cup 7 as an integral part thereof, a considerable degree of rigidity is imparted to the plate permitting the use of relatively thin material for this part which is economical in both the matter of space and of cost. An annular channel member 32, welded or otherwise secured to the face of the plate 6, serves to centrally and accurately position this plate between the housing 1 and the fan case 3.

The cleaner parts may be readily disassembled by removal of the screws 10 after which operation the fan casing 3 and motor casing 1 may be separated and the cleaner fan, bearing plate and motor armature may be removed as a unit from the casing upon removal of the cap 29 and the nut 31 which is carried on the outer end of the armature shaft.

My improved motor construction is shown in connection with vacuum cleaners to which construction it is particularly adaptable, but it is obvious that it could be incorporated in other motor driven devices as well as motors per se. Furthermore, it is to be understood that this particular form of apparatus shown and described, and the particular procedure set forth are presented for purposes of explanation and that various modifications of said apparatus and procedure can be made without departing from my invention as described in the appended claims.

Having thus described my invention what I claim is:

1. In an electrically operated device, a fan case having a centrally located inlet opening, a fan in said fan case having a central cone-shaped body and a plurality of blades converging thereto, and a similarly shaped bearing plate having its peripheral edge secured to said device and positioned closely adjacent to and parallel with said fan in nested relation, said plate having a bearing cup formed in the central portion thereof, a bearing removably supported in said cup with its center lying substantially within the plane defined by the peripheral portion of said plate, and a motor for said device having a shaft journaled in said bearing and secured to said fan.

2. In an electrically operated vacuum cleaner, a rotary fan comprising an imperforate disk having a central cone shaped portion, and a plurality of radial blades projecting from the face of the disk, an apertured bearing plate of similar contour to said fan body positioned in nested relation therewith and having a bearing cup in the depression thereof, a bearing in said cup, a motor armature shaft rotatably supported by said bearing and extending through said plate, and a motor cooling fan carried by said shaft and having blades projecting into the depression of said bearing plate.

3. In an electrically operated vacuum cleaner, a rotary fan comprising an imperforate disk having a central cone shaped portion and a plurality of blades on one side of the disk converging thereto, an apertured bearing plate of similar contour to said fan body positioned in nested relation therewith and having a bearing cup in the depression thereof, a bearing in said cup, a motor armature shaft rotatably supported by said bearing and extending through said plate, and a motor cooling fan carried by said shaft and having blades extending over the cup and projecting into the recess formed by the central cone of said plate.

4. In an electric motor, a cup shaped motor housing, an armature shaft journaled at one end in a bearing supported in the end wall of said housing, a unitary pressed metal saucer-shaped bearing plate having a cup formed therein and adapted to provide a closure for the open end of said motor housing, means for securing the peripheral edge of said plate to said housing, a removable bearing disposed within said cup for rotatably supporting the other end of said armature shaft, the center of said bearing lying substantially in the plane of the peripheral portion of said plate, and a motor cooling fan carried by said shaft and having blades extending over said cup.

5. In an electrically operated device, a cup shaped motor housing, a bearing at the closed end of said housing, an armature shaft journaled at one end in said bearing, a unitary pressed metal dished plate having a cup projecting into the dished portion thereof located at the open end of said housing in closing relation, a bearing in the cup of said plate, the other end of said armature shaft being journaled in and projecting through said last named bearing, an impeller fan on the projecting end of said shaft, and a fan case located at the open end of said housing alongside said plate, said fan case having one side wall cut away to form an opening for receiving said fan and having a central inlet aperture formed in the opposite side wall thereof, said fan having a circular imperforate base with upstanding blades, the base of said fan being dished similarly to said plate and positioned in nested relation therewith and the blades of said fan extending to a point closely adjacent to the apertured side wall of said fan case and being of smaller area at the central part of the fan.

6. In an electrically operated device, a cup shaped motor housing, a bearing at the closed end of said housing, an armature shaft journaled at one end in said bearing, a unitary pressed metal dished plate having a cup projecting into the dished portion thereof located at the open end of said housing in closing relation, a bearing removably and frictionally fitted in the cup of said plate, the other end of said armature shaft being journaled in and projecting through said last named bearing, an impeller fan on the projecting end of said shaft, and a fan case located at the open end of said housing alongside said plate, said fan case having one side wall cut away to form an opening for receiving said fan and having a central inlet aperture formed in the opposite side wall thereof, said fan having a circular imperforate base with upstanding blades, the base of said fan being dished similarly to said plate and positioned in nested relation therewith and the blades of said fan extending to a point closely adjacent to the apertured side wall of said fan case and being of smaller area at the central part of the fan.

7. In an electrically operated device, a cup shaped motor housing, a bearing at the closed end of said housing, an armature shaft journaled at one end in said bearing, a unitary pressed metal dished plate having a cup projecting into the dished portion thereof located at the open end of said housing in closing relation, a bearing in the cup of said plate, the other end of said armature shaft being journaled in and projecting through said last named bearing, an impeller fan on the projecting end of said shaft, a fan case located at the open end of said housing alongside said plate, said fan case having one side wall cut away to form an opening for receiving said fan and having a central inlet aperture formed in the opposite side wall thereof, said fan having a circular imperforate base with upstanding blades, the base of said fan being dished similarly to said plate and positioned in nested relation therewith and the blades of said fan extending to a point closely adjacent to the apertured side wall of said fan case and being of smaller area at the central part of the fan, and a second impeller fan carried by said armature shaft in the space between the armature windings and said plate, said last named fan having blades extending into the recess formed by the dished part of said plate.

8. In an electrically operated device, a cup shaped motor housing, a bearing at the closed end of said housing, an armature shaft journaled at one end in said bearing, a unitary pressed metal dished plate having a cup projecting into the dished portion thereof located at the open end of said housing in closing relation, a bearing in the cup of said plate, the other end of said armature shaft being journaled in and projecting through said last named bearing, an impeller fan on the projecting end of said shaft, a fan case located at the open end of said housing alongside said plate, said fan case having one side wall cut away to form an opening for receiving said fan and having a central inlet aperture formed in the opposite side wall thereof, said fan having a circular imperforate base with upstanding blades, the base of said fan being dished similarly to said plate and positioned in nested relation therewith and the blades of said fan extending to a point closely adjacent to the apertured side wall of said fan case and being of smaller area at the central part of the fan, and a second impeller fan carried by said armature shaft in the space between the armature windings and said plate, said last named fan having blades closely overlying the cup and extending into the recess formed by the dished part of said plate.

9. In an electrically operated device, a cup shaped motor housing, a bearing at the closed end of said housing, an armature shaft journaled at one end in said bearing, a unitary pressed metal dished plate having a cup projecting into the dished portion thereof located at the open end of said housing in closing relation, a bearing in the cup of said plate, the other end of said armature shaft being journaled in and projecting through said last named bearing, an impeller fan on the projecting end of said shaft, a fan case located at the open end of said housing alongside said plate, said fan case having one side wall cut away to form an opening for receiving said fan and having a central inlet aperture formed in the opposite side wall thereof, and an annular channeled sheet metal member carried by said plate and closely fitting in the cut-away part of said fan case, said fan having a circular imperforate base with upstanding blades, the base of said fan being dished similarly to said plate and positioned in nested relation therewith and the blades of said fan extending to a point closely adjacent to the apertured side wall of said fan case and being of smaller area at the central part of the fan.

10. In an electrically operated device, a cup shaped motor housing, a bearing at the closed end of said housing, an armature shaft journaled at one end in said bearing, a unitary pressed metal dished plate having a cup projecting into the dished portion thereof located at the open end of said housing in closing relation, a bearing in the cup of said plate, the other end of said armature shaft being journaled in and projecting through said last named bearing, an impeller fan on the projecting end of said shaft, a fan case located at the open end of said housing alongside said plate, said fan case having one side wall cut away to form an opening for receiving said fan and having a central inlet aperture formed in the opposite side wall thereof, an annular channeled sheet metal member carried by said plate and closely fitting in the cut away part of said fan case, and means engaging said housing and said fan case for securing these parts to each other and for clamping the edge of said plate therebetween, said fan having a circular imperforate base with upstanding blades, the base of said fan being dished similarly to said plate and positioned in nested relation therewith and the blades of said fan extending to a point closely adjacent to the apertured side wall of said fan case and being of smaller area at the central part of the fan.

11. In a high speed electric motor, a motor housing having an open end, an armature in said housing, a unitary die-formed sheet metal plate providing a closure for the open end of said motor housing, said plate having annular, axially offset portions one outside the other and extending in opposite directions to either side of the plane defined by the peripheral portion of said plate, the innermost of said offset portions being in the form of a cylindrical bearing-supporting sleeve, a removable bearing frictionally fitted in the bearing-supporting sleeve of said plate, and an armature shaft carried by said bearing.

12. In a high speed electric motor, a motor housing having an open end, an armature in said housing, a unitary die-formed sheet metal plate providing a closure for the open end of said motor housing, said plate having annular, axially offset portions one surrounding the other and projecting beyond the plane defined by the peripheral portion of said plate, the innermost of said offset portions being in the form of a cylindrical bearing-supporting sleeve, a removable bearing frictionally fitted in the bearing-supporting sleeve of said plate, an armature shaft carried by said bearing, and a fan carried by said armature shaft having a disk with annular, axially offset portions for the accommodation of certain of the offset portions of said plate.

13. A device of the class described comprising an electric motor, a shaft and a frame for said motor, said frame including a unitary, sheet metal, die-formed bearing plate having portions axially offset in opposite directions to produce therewith an integrally formed cup of substantial depth centrally of the plate, the bottom of said cup being formed with an opening adapted to receive said shaft, a ball-bearing for said shaft snugly yet slidably fitted within said cup, and means for detachably securing the margin of said plate directly to said motor frame.

14. A device of the class described comprising an electric motor, a shaft and a frame for said motor, said frame including a unitary, sheet metal, die-formed bearing plate having portions axially offset in opposite directions to produce therewith an integrally formed cup of substantial depth, the bottom of said cup being formed with an opening adapted to receive said shaft, a ball-bearing for said shaft and lubricant retaining means therefor fitted within said cup, said ball-bearing being snugly yet slidably received by said cup, and means for detachably securing the margin of said plate directly to said motor frame.

15. In a high speed electric motor adapted particularly for use in connection with electrically operated vacuum cleaners, a motor housing having an open end, an armature in said housing, a unitary, die-formed, sheet metal plate providing a closure for the open end of said motor housing, said plate having annular, axially offset portions one outside the other and extending in opposite directions to either side of the plane defined by the peripheral portion of said plate, the innermost of said offset portions being in the form of a cylindrical bearing-supporting sleeve of substantial depth, a removable ball-bearing and lubricant retaining means therefor fitted in the bearing-supporting sleeve of said plate, said ball-bearing being snugly yet slidably held by said sleeve, and an armature shaft carried by said bearing.

16. In a high speed electric motor adapted particularly for use in connection with electrically operated vacuum cleaners, a motor housing having an open end, an armature in said housing, a unitary, die-formed, sheet metal plate providing a closure for the open end of said motor housing, said plate having annular, axially offset portions one surrounding the other and projecting beyond the plane defined by the peripheral portion of said plate, the innermost of said offset portions being in the form of a cylindrical bearing-supporting sleeve of substantial depth, a removable ball-bearing frictionally fitted in the bearing-supporting sleeve of said plate, said ball-bearing being snugly yet slidably held by said sleeve, an armature shaft carried by said bearing, and a fan carried by said armature shaft having a disk with a central, annular, axially offset portion, for the accommodation of an offset portion of said plate.

17. In an electrically operated device, a motor housing, a bearing at one end of said housing, an armature shaft journaled at one end in said bearing, a pressed-metal plate at the other end of said housing having integral annular portions offset in opposite directions, one of the offset portions of said plate defining an apertured cup, a bearing in said cup for rotatably supporting the other end of said armature shaft, said shaft projecting through said bearing and extending outwardly therebeyond, an impeller fan on the projecting end of said shaft, and a fan case located alongside said plate at the end of said housing, said fan case having an opening at one side for receiving said fan and having an air inlet opening opposite thereto, said fan having an imperforate base with upstanding blades, such base being configured to receive in nested relation one of the offset portions of said plate, the blades of said fan extending to a point closely adjacent to the wall of the fan case having the inlet opening and being of smaller area as the central part of the fan is approached.

18. In an electrically operated device, a motor housing, a bearing at one end of said housing, an armature shaft journaled at one end in said bearing, a pressed-metal plate at the other end of said housing having integral annular portions offset in opposite directions, one of the offset portions of said plate defining an apertured cup, a bearing in said cup for rotatably supporting the other end of said armature shaft, said shaft projecting through said bearing and extending outwardly therebeyond, an impeller fan on the projecting end of said shaft, a fan case located alongside said plate at the end of said housing, said fan case having an opening at one side for receiving said fan and having an air inlet opening opposite thereto, said fan having an imperforate base with upstanding blades, such base being configurated to receive in nested relation one of the offset portions of said plate, the blades of said fan extending to a point closely adjacent to the wall of the fan case having the inlet opening and being of smaller area as the central part of the fan is approached, and a bladed impeller fan on said shaft inside said housing extending in part at least into the area alongside said plate behind the plane defined by the outermost part of the other of the offset portions of the plate.

ARTHUR W. SEYFRIED.